(12) United States Patent
Banerjee et al.

(10) Patent No.: US 10,628,214 B2
(45) Date of Patent: Apr. 21, 2020

(54) METHOD FOR SCHEDULING ENTITY IN MULTICORE PROCESSOR SYSTEM

(71) Applicant: Samsung Electronics Co., Ltd., Suwon-si, Gyeonggi-do (KR)

(72) Inventors: Aniruddha Banerjee, Bangalore (IN); Sharan Kumar Allur, Bangalore (IN); Syam Prasad Kuncha, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/571,191

(22) PCT Filed: Jun. 1, 2016

(86) PCT No.: PCT/KR2016/005088
§ 371 (c)(1),
(2) Date: Nov. 1, 2017

(87) PCT Pub. No.: WO2016/195274
PCT Pub. Date: Dec. 8, 2016

(65) Prior Publication Data
US 2018/0260243 A1    Sep. 13, 2018

(30) Foreign Application Priority Data
Jun. 1, 2015 (IN) ............................ 2761/CHE/2015

(51) Int. Cl.
*G06F 9/48* (2006.01)
*G06F 9/50* (2006.01)

(52) U.S. Cl.
CPC .............. *G06F 9/4881* (2013.01); *G06F 9/48* (2013.01); *G06F 9/50* (2013.01); *G06F 9/505* (2013.01); *G06F 9/5038* (2013.01); *G06F 2209/5021* (2013.01)

(58) Field of Classification Search
CPC ...................................................... G06F 9/4881
See application file for complete search history.

(56) References Cited

U.S. PATENT DOCUMENTS

| 7,797,484 B2 * | 9/2010 | Bedi ..................... G06F 3/0613 711/112 |
| 8,615,647 B2 | 12/2013 | Hum et al. |
| 8,793,686 B2 | 7/2014 | Aasheim |
| 2006/0150187 A1 * | 7/2006 | Vaddagiri ............. G06F 9/4843 718/102 |

(Continued)

*Primary Examiner* — Sisley N Kim
(74) *Attorney, Agent, or Firm* — Jefferson IP Law, LLP (57) ABSTRACT

The embodiments herein provide a method for scheduling an entity in a multi-core processor system including a big-core processor, and a little-core processor. The method includes detecting, by a scheduler, that a load contribution of the entity exceeds a load threshold. Further, the method includes determining, by the scheduler, whether the entity is one of a background entity, an IO intensive entity, a non-background entity, and a non-IO intensive entity based on at least one parameter. Further, the method includes instructing, by the scheduler, one of to schedule the entity on a little-core processor when the entity is at least one of the background entity and the IO intensive entity; and to schedule the entity on the big-core processor when the entity is at least one of the non-background entity and the non-IO intensive entity.

14 Claims, 4 Drawing Sheets

(56) References Cited

U.S. PATENT DOCUMENTS

| | | |
|---|---|---|
| 2011/0213934 A1 | 9/2011 | Greenhalgh et al. |
| 2011/0213935 A1 | 9/2011 | Greenhalgh et al. |
| 2013/0311725 A1 | 11/2013 | Greenhalgh |
| 2014/0013020 A1* | 1/2014 | Horsnell ............... G06F 13/24 710/260 |
| 2014/0059262 A1 | 2/2014 | Davis et al. |
| 2014/0059558 A1 | 2/2014 | Davis et al. |
| 2014/0143791 A1* | 5/2014 | Mark ................... G06F 9/485 719/318 |
| 2014/0325511 A1 | 10/2014 | Aasheim |
| 2015/0040136 A1 | 2/2015 | Matthes et al. |
| 2015/0121105 A1* | 4/2015 | Ahn ..................... G06F 1/324 713/322 |
| 2016/0092274 A1* | 3/2016 | Singh ................. G06F 9/5027 718/104 |

\* cited by examiner

METHOD FOR SCHEDULING ENTITY IN MULTICORE PROCESSOR SYSTEM

TECHNICAL FIELD

The embodiments herein generally relate to scheduling mechanisms. More particularly, related to a mechanism for scheduling an entity in a multi-core processor system. The present application is based on, and claims priority from an Indian Application Number 2761/CHE/2015 filed on 1 Jun. 2015, the disclosure of which is hereby incorporated by reference herein.

BACKGROUND ART

The rise of smart phones has been phenomenal in the last decade. They have come a long way from merely a two way radio to an electronic device that keeps you connected to all the information throughout the day. The demand for performance has hence been increasing at a much faster rate than the corresponding improvements in a battery technology. The demand for higher performance is thus in direct conflict with the battery life of the smart phone and this has in turn led to a lot of innovation in the field of power management. This includes a lot of advanced power management features built into an Operating System (OS) itself along with advancements in display technology like active-matrix organic light-emitting diode (AMOLED). This eventually led to a silicon on chip (SoC) design, where the processing of the performance-intensive power-hungry "big" cores are coupled with a power-saving "LITTLE" cores in the same system joined by a cache coherent interconnect fabric. This architecture is called a big.LITTLE™ architecture.

The Completely Fair scheduler (CFS) is a task based scheduler in Linux operating system. The CFS schedules the entities on cores based on the execution history of the entities. The Task scheduler was not intrinsically built to take advantage of a Heterogeneous Multiprocessing (HMP) System like big.LITTLE™ architecture but was designed for a Symmetric Multiprocessing (SMP) System. This led to a set of patches that added information regarding the per-entity utilization of a core to the CFS.

The CFS algorithm primarily tracks the amount of time that a scheduling entity has run on a virtualized ideal multi-tasking processor. If a particular scheduling entity has run for a lesser virtual time than the entity that is currently executing on the processor, the fairness of the system is not maintained anymore. Hence, the entity that is currently running is pre-empted by the entity that has run for a lesser amount of time to maintain fairness. This system works efficiently for the SMP system as all the cores are equal and the Scheduler can treat them as the same. However, this does not hold good for the HMP system. In the current HMP implementation, a scheduling entity is classified as a big or a small entity based on its execution history calculated by any of per-entity Load tracking method and Window based tracking. When the load determined form this execution history exceeds a predefined threshold, the corresponding entity is categorized as a big entity or otherwise as a small entity. This is then placed on the big or little cluster correspondingly.

In the conventional systems and methods, the task scheduling is based on the load history of the task. If the load contribution of the entity exceeds a predefined load threshold, then the task is scheduled on the big cores irrespective of the characteristic of the task. This eventually affects the user experience and the battery life of the system. In an example, if the task is a background task which does not need the additional processing power of the big cores, may be scheduled on the big cores when the the load contribution of the entity exceeds a predefined load threshold. This increases the power consumption of the electronic device as the big cores are performance intensive.

DISCLOSURE OF INVENTION

Solution to Problem

Accordingly the embodiments herein provide a method for scheduling an entity in a multi-core processor system including a big-core processor, and a little-core processor. The method includes detecting, by a scheduler, that a load contribution of the entity exceeds a load threshold. Further, the method includes determining, by the scheduler, whether the entity is one of a background entity, an IO intensive entity, a non-background entity, and a non-IO intensive entity based on at least one parameter. Further, the method includes instructing, by the scheduler, one of to schedule the entity on a little-core processor when the entity is at least one of the background entity and the IO intensive entity; and to schedule the entity on the big-core processor when the entity is at least one of the non-background entity and the non-IO intensive entity.

Advantageous Effects of Invention

Accordingly the embodiments herein provide a method for scheduling an entity in a multi-core processor system including a big-core processor, and a little-core processor.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 5 illustrates a computing environment implementing the method and system for scheduling the entity in the

BEST MODE FOR CARRYING OUT THE INVENTION

Accordingly the embodiments herein provide a method for scheduling an entity in a multi-core processor system including a big-core processor, and a little-core processor. The method includes detecting, by a scheduler, that a load contribution of the entity exceeds a load threshold. Further, the method includes determining, by the scheduler, whether the entity is one of a background entity, an IO intensive entity, a non-background entity, and a non-IO intensive entity based on at least one parameter. Further, the method includes instructing, by the scheduler, one of to schedule the entity on a little-core processor when the entity is at least one of the background entity and the IO intensive entity; and to schedule the entity on the big-core processor when the entity is at least one of the non-background entity and the non-IO intensive entity.

Accordingly the embodiments herein provide an electronic device for scheduling an entity in a multi-core processor system including a big-core processor, and a little-core processor. The electronic device includes a memory, a processor coupled to the memory, and a scheduler coupled to the processor. Further, the scheduler is configured to detect that a load contribution of the entity exceeds a load threshold. Further, the scheduler is configured to determine whether the entity is one of a background entity, an IO intensive entity, a non-background entity, and a non-IO intensive entity based on at least one parameter. Further, the scheduler is configured to instruct one of to schedule the entity on a little-core processor when the entity is at least one of the background entity and the IO intensive entity; and to schedule the entity on the big-core processor when the entity is at least one of the non-background entity and the non-IO intensive entity.

Accordingly the embodiments herein provide a computer program product comprising computer executable program code recorded on a computer readable non-transitory storage medium. The computer executable program code when executed causing the actions including detecting, by a scheduler, that a load contribution of an entity exceeds a load threshold. Further, the computer executable program code when executed causing the actions including determining, by the scheduler, whether the entity is one of a background entity, an IO intensive entity, a non-background entity, and a non-IO intensive entity based on at least one parameter. Further, the computer executable program code when executed causing the actions including instructing, by the scheduler, one of to schedule the entity on a little-core processor when the entity is at least one of the background entity and the IO intensive entity; and to schedule the entity on the big-core processor when the entity is at least one of the non-background entity and the non-IO intensive entity.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

MODE FOR THE INVENTION

The principal object of the embodiments herein is to provide a mechanism for scheduling an entity in a heterogeneous multi-core processor system such as a big.LITTLE™ architecture based processor system.

Another object of the embodiments herein is to provide a mechanism for detecting whether a load contribution of the entity exceeds a load threshold.

Another object of the embodiments herein is to provide a mechanism for determining whether the entity is one of a background entity, an IO intensive entity, a non-background entity, and a non-IO intensive entity based on at least one parameter.

Another object of the embodiments herein is to provide a mechanism for instructing one of to schedule the entity on the little-core processor when the entity is at least one of the background entity and the IO intensive entity; and to schedule the entity on the big-core processor when the entity is at least one of the non-background entity and the non-IO intensive entity.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein disclose a method for scheduling an entity in a multi-core processor system including a big-core processor, and a little-core processor. The method includes detecting that a load contribution of the entity exceeds a load threshold. Further, the method includes determining whether the entity is one of a background entity, an Input-Output (IO) intensive entity, a non-background entity, and a non-IO intensive entity based on at least one parameter. Further, the method includes instructing one of to schedule the entity on the little-core processor when the entity is at least one of the background entity, and the IO intensive entity; and to schedule the entity on the big-core processor when the entity is at least one of the non-background entity and the non-IO intensive entity.

In an embodiment, the parameter includes an Out-of-Memory (OOM) Score, an IO Turn-Around-Time, an amount of time that the entity is performing IO task in a pre-defined time period, a total execution time of the entity in the pre-defined time period, or combination of same.

In an embodiment, the background entity is one of a periodic task and a period service without user intervention.

In the conventional systems and methods, the entity is scheduled in the multi-core processor system based on the load contribution of the entity. If the load contribution of the entity exceeds the load threshold, then the task is scheduled on the big-core processor irrespective of the characteristic of the task. For example, the background entity does not need additional processing power of the big-core processor. If the load contribution of the background entity exceeds the load threshold then, the background entity may be scheduled on the big-core processor. Thus, affecting the power consumption of the electronic device as the big-core processors are performance intensive.

Unlike the conventional systems and methods, the proposed mechanism provides a power efficient scheduler design without impacting the performance of an electronic device that includes the multi-core processor system. Further, the proposed method provides a mechanism for improving the power consumption of the electronic device by dividing performance intensive entities between the big-core processor (in case of the non-background entity exceeding the load threshold) and the little-core processor (in case of the background entity exceeding the load threshold). The background entity is scheduled on the little-core processor even though its immediate load might be high, thus lowering the migration cost and resulting in better power consumption of the electronic device without impacting the performance.

Unlike the conventional systems and methods, the proposed mechanism avoids migration of the background entity from the little-core processor to the big-core processor even though the load contribution of the background entity exceeding the load threshold.

Referring now to the drawings, and more particularly to FIGS. 1 through 5, where similar reference characters denote corresponding features consistently throughout the figures, there are shown preferred embodiments.

Figure 1:
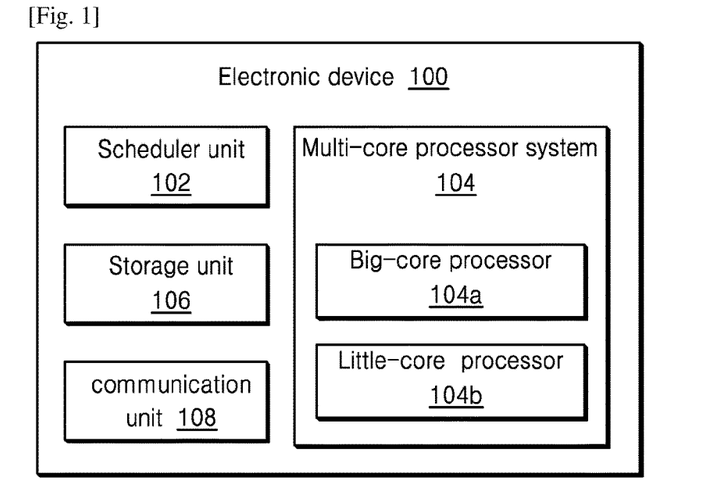
FIG. 1 illustrates various units of an electronic device for scheduling an entity in a multi-core processor system including a big-core processor, and a little-core processor, according to an embodiment as disclosed herein.

FIG. 1 illustrates various units of an electronic device 100 for scheduling the entity in a multi-core processor system 104 including a big-core processor 104a, and a little-core processor 104b, according to an embodiment as disclosed herein. In an embodiment, the electronic device 100 includes a scheduler unit 102, a multi-core processor system 104, a storage unit 106, and a communication unit 108. The multi-core processor system 104 includes a Big-core processor 104a and a Little-core processor 104b. The electronic device 100 may be a mobile phone, a smart phone, Personal Digital Assistants (PDAs), a tablet, a phablet, consumer electronic device, dual display devices, or any other electronic devices. In an embodiment, the entity may be a task, a thread, a data flow, or the like.

In an embodiment, the scheduler unit 102 detects that a load contribution of the entity exceeds a load threshold. Further, the scheduler unit 102 can be configured to determine whether the entity is a background entity, an Input-Output (IO) intensive entity, a non-background entity, or a non-IO intensive entity based on at least one parameter. In an embodiment, the parameter includes an Out-of-Memory (OOM) Score, an IO Turn-Around-Time, amount of time that the entity is performing IO task in the pre-defined time period, total execution time of the entity in the pre-defined time period, or combination of same. Further, the scheduler unit 102 can be configured to instruct the multi-core processor system 104 to schedule the entity on the little-core processor 104b when the entity is the background entity or the IO intensive entity. Furthermore, the scheduler unit 102 can be configured to instruct the multi-core processor system 104 to schedule the entity on the big-core processor 104a when the entity is the non-background entity or the non-IO intensive entity.

Further, the storage unit 106 may include one or more computer-readable storage media. The storage unit 106 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage unit 106 may, in some examples, be considered a non-transitory storage medium. The term "non-transitory" may indicate that the storage medium is not embodied in a carrier wave or a propagated signal. However, the term "non-transitory" should not be interpreted that the storage unit 106 is non-movable. In some examples, the storage unit 106 can be configured to store larger amounts of information than the memory. In certain examples, a non-transitory storage medium may store data that can, over time, change (e.g., in Random Access Memory (RAM) or cache). The communication unit 108 can be configured for communicating internally between the units and externally with the networks.

In the conventional systems and methods, execution history of the scheduling entity is considered when scheduling the entity in either the big-core processor 104a or the little-core processor 104b. When the load is above a certain threshold the scheduling entity is considered big and is scheduled on the big-core processor 104a. All other entities are placed in the little-core processor 104b. Further, this scheme can hence schedule background entities, which do not need the additional processing power on the big-core processor 104a, on the big-core processor 104a due to spurious bursts in the load of the task. This will increase the power consumption of the electronic device 100 while not providing any benefits to the user experience.

Unlike the conventional mechanisms, the proposed mechanism is used to schedule the entities based on the entity being either the background entity or the IO intensive entity and hence scheduling the entity on certain cores based on these additional characteristics. The additional transient characteristics were primarily used in the core processor selection for the big.LITTLE architecture. Thus, leading to a more energy efficient scheduler design whilst not impacting the performance of the electronic device 100.

The FIG. 1 shows a limited overview of the electronic device 100 but, it is to be understood that other embodiments are not limited thereto. Further, the electronic device 100 can include any number of units along with other hardware or software components communicating with each other.

Figure 2A:
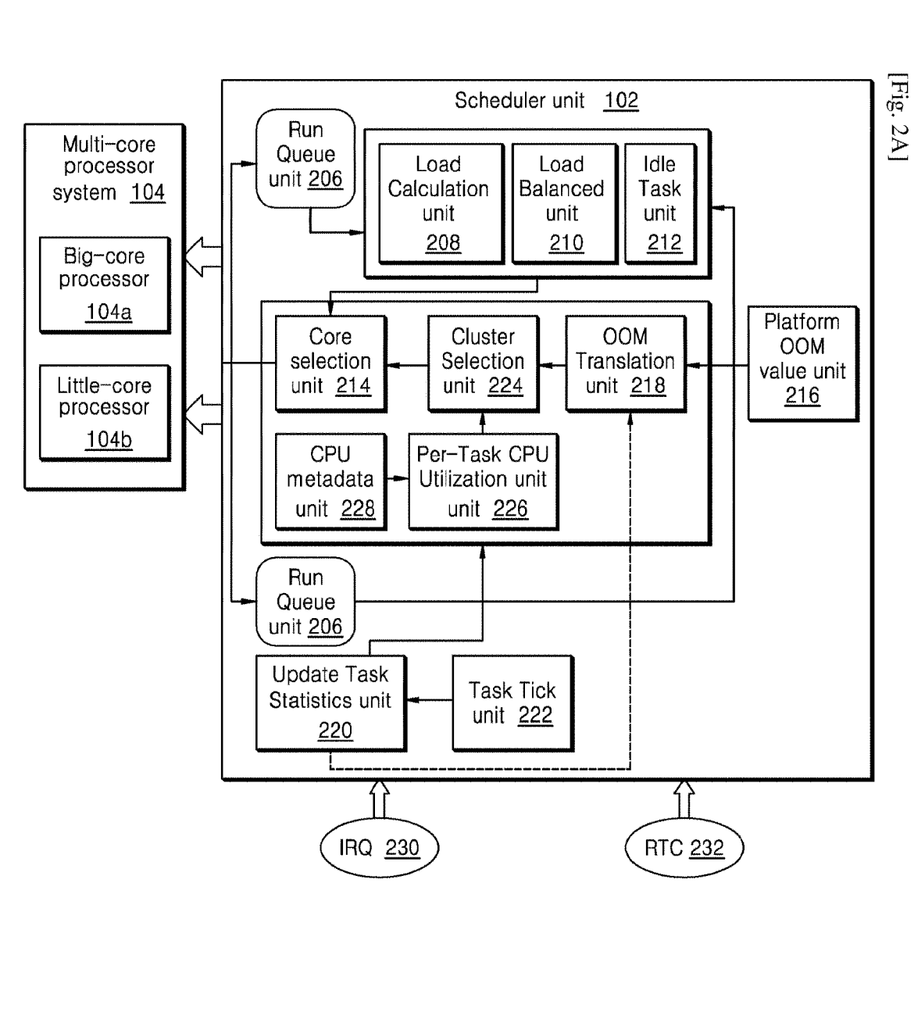
FIG. 2a illustrates a communication flow between a multi-core processor system and a scheduler for determining whether the entity is one of a background entity and a non-background entity, according to an embodiment as disclosed herein.

FIG. 2a illustrates a communication flow between the multi-core processor system 104 and the scheduler unit 102 for determining whether the entity is the background entity or the non-background entity, according to an embodiment as disclosed herein.

In an embodiment, the scheduler unit 102 includes Run Queue unit 206, —a Load Calculation unit 208, a Load Balance unit 210, an Idle Task unit 212, a Core selection unit 214, a platform OOM value unit 216, an OOM Translation unit 218, an Update Task Statistics unit 220, a Task Tick unit 222, a Cluster Selection unit 224, a Per-Task CPU Utilization unit 226, a CPU metadata unit 228, an Interrupt request (IRQ) 230, and a Real-time clock (RTC) 232.

In an embodiment, the Run Queue unit 206 tracks runnable tasks (e.g., entities) for a given core (i.e., either the big-core processor 104a or the little-core processor 104b). In an embodiment, the load calculation unit 208 tracks load per entity and load per run queue in the scheduler unit 102. In an embodiment, the load balance unit 210 balances load across the multi-core processor system 104 including the big-core processor 104*a*, and the little-core processor 104*b*. In an embodiment, the idle task unit 212 tracks an ideal entity. In an embodiment, the core selection unit 214 selects a core (i.e., either the big-core processor 104*a* or the little-core processor 104*b*) to schedule the entity in the multi-core processor system 104 including the big-core processor 104*a*, and the little-core processor 104*b*. In an embodiment, the cluster selection unit 224 selects either the big-core processor 104*a* or the little-core processor 104*b* in the multi-core processor system 104 for scheduling the entity. In an embodiment, the OOM Translation unit 218 is configured to translate OOM score to a scheduler understandable format. In an embodiment, the CPU metadata unit 228 tracts CPU utilization or CPU performance.

In an embodiment, the Per-Task CPU Utilization unit 226 tracks the CPU utilization by the entity. In an embodiment, the update task statistics unit 220 updates statistics related to scheduling the entity into the scheduler unit 102. In an embodiment, the task tick unit 222 tracks a number of times the entity is scheduled in the multi-core processor system 104. In an example, consider a scenario where the proposed mechanism is configured to schedule the entity from the Run Queue unit 206 in the multi-core processor system 104.

Further, the load calculation unit 208 tracks the load of the entity and compare with a load threshold (i.e., detecting that the load contribution of the entity exceeds the load threshold). If it is tracked that the load contribution of the entity does not exceed the load threshold, then the idle task unit 212 checks whether the entity is the idle or the entity is not the idle entity. If the entity is the idle, then the scheduler unit 102 considers the entity as low priority for scheduling. If the entity is not the idle and the load contribution of the entity does not exceed the load threshold, then the core selection unit 214 selects the Little-core processor 104*b* for scheduling the entity. If it is tracked that the load contribution of the entity exceeds the load threshold, then the scheduler unit 102 is configured to detect whether the entity is the background entity or the non-background entity based on the OOM score of the entity from the Platform OOM value unit 216.

For example, Linux kernel, the OOM score of the entity is used to prioritize terminating of certain entities over other entities when page allocation fails in the slow-path. Further, the OOM score is also used by any platform to categorize and hence terminate the entities those have minimum contribution towards user experience when the system memory falls below a predefined threshold. For example, the platform may be an operating system of the electronic device 100. The categorization of the entities is from lowest value entities to highest value entities. The lowest OOM score is assigned only for native entities and highest value is assigned for the entities, whose OOM score is yet to be calculated. The entities assigned with higher OOM score are terminated first when the system runs out of memory. The OOM scores that are used by the platform categorize the entities based on characteristics of the entities. This is used by the scheduler unit 102 to categorize the entity as either the background entity or the non-background entity.

In an embodiment, the OOM scores that are used by the platform to categorize the entities may be computed as shown in equation (1).

$$S_{platform} = S_{kernel} * (-OOM_{disable}) / OOM_{max} \quad (1)$$

Where, $S_{kernel}$ is the OMM score of an operating system kernel, $S_{platform}$ is the OMM score used in the operating system of the electronic device 100, $OOM_{disable}$ is highest allowed OOM score, $OOM_{max}$ is highest OOM score.

The $S_{platform}$ value from the equation (1) is used as an input to the scheduler unit 102 by the platform OOM value unit 216. Based on the computed $S_{platform}$ value, the entity is categorized as either the background entity or the non-background entity. For example, when the $S_{platform}$ value is lower than the predefine threshold (i.e., load threshold), the entity is considered as the background entity. Similarly, when computed value of $S_{platform}$ is higher than the predefined threshold, the entity is considered as the non-background entity.

Further, the OOM Translation unit 218 translates the OOM score to the scheduler understandable format while considering an input from the Update Task Statistics unit 220. The input from the Update Task Statistics unit 220 includes an updated entity structure. The Update Task Statistics unit 220 updates entity statistics into structure of the entity based on frequency of execution data from the Task Tick unit 222.

Furthermore, the OOM Translation unit 218 forwards the OOM score (i.e., which is inform of scheduler understandable format) to the Cluster Selection unit 224. The cluster selection unit 224 selects either the big-core processor 104*a* or the little-core processor 104*b* in the multi-core processor system 104 for scheduling the entity based on the OOM score from the OOM Translation unit 218. Further, the Cluster Selection unit 224 receives input from the Per-Task CPU Utilization unit 226. The Per-Task CPU Utilization unit 226 tracks the CPU utilization by the entity based on the input from the CPU metadata unit 228. The CPU metadata unit 226 tracts CPU utilization or CPU performance of the proposed mechanism.

Further, the cluster selection unit 224 instructs the Core selection unit 214 to schedule the entity on a little-core processor 104*b* when the entity is the background entity while considering the load contribution of the entity from the Load Calculation unit 208, load balance unit 210, and the updated entity statistic from the Update Task Statistics unit 220. Further, the cluster selection unit 224 instructs the Core selection unit 214 to schedule the entity on the big-core processor 104*a* when the entity is the non-background entity while considering the load contribution of the entity from the Load Calculation unit 208, and the updated entity statistic from the Update Task Statistics unit 220. Further, the IRQ 230 and the RTC 232 influence frequency of execution of the scheduler 102.

In an embodiment, the background entity is one of the periodic task and the period service without the user intervention. The periodic task is persistent and hence requires less processing bandwidth. In an example, the OOM score of the periodic task is −12. Further, the period service runs at the default adjustment and having none directly interactive component. In an example, the OOM score of the period service is −16.

Figure 2B:
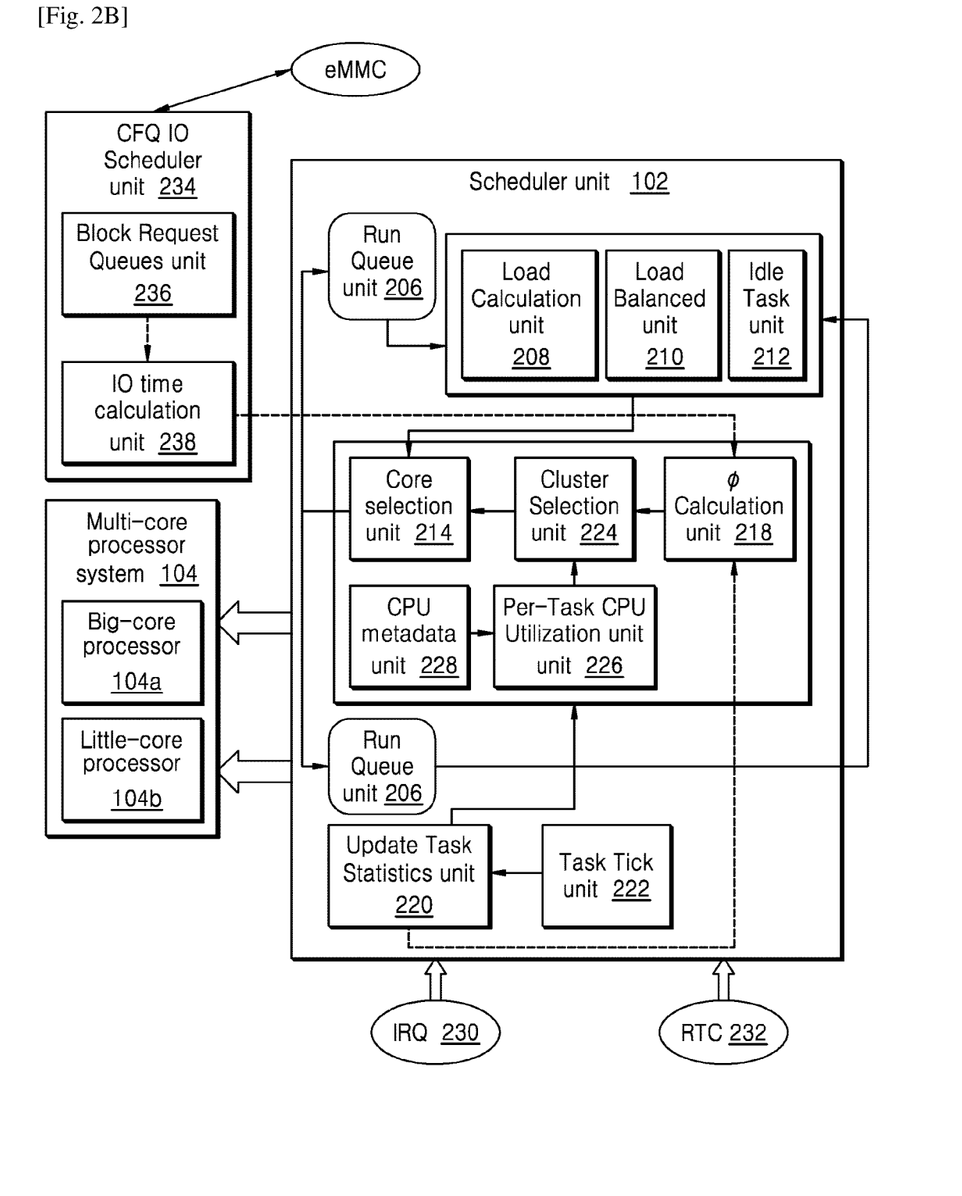
FIG. 2b illustrates a communication flow between the multi-core processor system and the scheduler for determining whether the entity is one of an IO intensive entity and a non-IO intensive entity, according to an embodiment as disclosed herein.

FIG. 2*b* illustrates a communication flow between the multi-core processor system 104 and the scheduler unit 102 for determining whether the entity is the IO intensive entity or the non-IO intensive entity, according to an embodiment as disclosed herein. In an embodiment, Completely Fair Queuing (CFQ) IO Scheduler unit 234 is in communication with the scheduler unit 102. In an embodiment, an embedded Multi-Media Card (eMMC) includes a flash memory and a controller in a small ball grid array (BGA) IC package. In an example, the CFQ is an I/O scheduler for the Linux kernel. In an embodiment, the CFQ IO Scheduler unit 234 includes Block Request Queues unit 236, and IO time calculation unit 238.

In an embodiment, the scheduler unit 102 includes Run Queue unit 206, the Load Calculation unit 208, the Load Balance unit 210, the Idle Task unit 212, the Core selection unit 214, the Cluster Selection unit 224, a calculation unit 240, the CPU metadata unit 228, the Per-Task CPU Utilization unit 226, the Update Task Statistics unit 220, the Task Tick unit 222, the IRQ 230, and the RTC 232.

Further, the scheduler unit 102 detects IO requests of the entity to the eMMC through a block IO subsystem of the operating system installed on the electronic device 100. Further, the CFQ IO Scheduler unit 234 handles IO requests for the block IO subsystem. Further, the CFQ IO Scheduler unit 234 dispatches the IO requests according to per-process queues of the Block Request Queues unit 236 and then allocates time periods for each of the process queues to access the storage unit 106 of the electronic device 100.

The scheduler unit 102 tracks the request from the entity and computes the time (by the IO time calculation unit 238) that the entity spends in performing IO in a pre-defined time period by accumulating time periods of successive block IO requests. This may be computed as shown in equation (2).

$$T_{io}=T_0+T_1+T_2 \ldots T_N \qquad (2)$$

Where $T_{io}$ is the total time the scheduling entity spent in performing IO task in the pre-defined time period, $T_0$ is the time spent in IO Request 0, $T_1$ is the time spent in IO Request 1, $T_2$ is the time spent in IO Request 2, or the like.

Furthermore, sum of execution runtime of the entity provides the execution time of the entity on the multi-core processor system 104. Thus, a total execution time that the entity spent on the multi-core processor system 104 in the pre-defined time period is accumulated and is represented as $T_{exec}$, for example. Further, the Ø calculation unit 240 computes a deciding metric (Φ) as shown in equation (3).

$$\Phi=T_{exec}/T_{io} \qquad (3)$$

The deciding metric (Φ) is used to categorize the entity as either the IO intensive entity or the non-IO intensive entity based on a logic. In an embodiment, the logic includes comparing computed value of the deciding metric (Φ) against an experimentally determined constant.

In an example, consider a scenario where the proposed mechanism is configured to schedule the entity from the Run Queue unit 206 in the multi-core processor system 104. Further, the load calculation unit 208 tracks the load of the entity and compare with a load threshold (i.e., detecting that the load contribution of the entity exceeds the load threshold). If it is tracked that the load contribution of the entity does not exceed the load threshold, then the idle task unit 212 checks whether the entity is the idle or the entity is not the idle entity. If the entity is the idle, then the scheduler unit 102 considers the entity as low priority for scheduling. If the entity is not the idle and the load contribution of the entity does not exceed the load threshold, then the core selection unit 214 selects the Little-core processor 104b for scheduling the entity. If it is tracked that the load contribution of the entity exceeds the load threshold, then the scheduler unit 102 is configured to detect whether the entity is the IO intensive entity or the non-IO intensive entity based on the deciding metric (Φ).

Further, the Ø calculation unit 240 send the deciding metric to the cluster selection unit 216 while considering an input from the Update Task Statistics unit 220. The input from the Update Task Statistics unit 220 includes an updated entity structure. The Update Task Statistics unit 220 updates entity statistics into structure of the entity based on frequency of execution data from the Task Tick unit 222.

The cluster selection unit 224 selects either the big-core processor 104a or the little-core processor 104b in the multi-core processor system 104 for scheduling the entity based on deciding metric (Φ) from the Ø calculation unit 240. Further, the Cluster Selection unit 224 receives input from the Per-Task CPU Utilization unit 226. The Per-Task CPU Utilization unit 226 tracks the CPU utilization by the entity based on the input from the CPU metadata unit 228. The CPU metadata unit 228 tracts CPU utilization or CPU performance of the proposed mechanism. Further, the cluster selection unit 224 instructs the Core selection unit 214 to schedule the entity on a little-core processor 104b when the entity is the IO-intensive entity while considering the load contribution of the entity from the Load Calculation unit 208, and the updated entity statistic from the Update Task Statistics unit 220. Further, the cluster selection unit 224 instructs the Core selection unit 214 to schedule the entity on the big-core processor 104a when the entity is the non-IO intensive entity while considering the load contribution of the entity from the Load Calculation unit 208, and the updated entity statistic from the Update Task Statistics unit 226. Further, the IRQ 230 and the RTC 232 influence frequency of execution of the scheduler 102.

In an embodiment, a heuristic mechanism is carried out to find the optimal value of Φ that provided a balance between performance and power consumption in the electronic device 100. This may be fine-tuned by a user.

Figure 3:
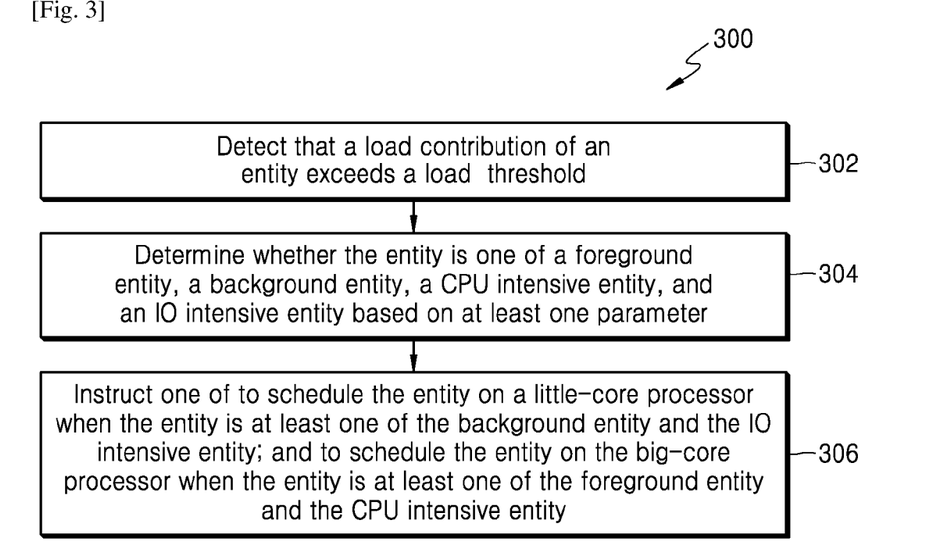
FIG. 3 is a flow diagram illustrating a method for scheduling the entity in the multi-core processor system including the big-core processor, and the little-core processor, according to an embodiment as disclosed herein.

FIG. 3 is a flow diagram illustrating a method 300 for scheduling the entity in the multi-core processor system 104 including the big-core processor 104a, and the little-core processor 104b, according to an embodiment as disclosed herein. At step 302, the method 300 includes detecting that the load contribution of the entity exceeds the load threshold. The method 300 allows the scheduler unit 102 to detect that the load contribution of the entity exceeds the load threshold.

At step 304, the method 300 includes determining whether the entity is the background entity, the IO intensive entity, the non-background entity, or the non-IO intensive entity based on at least one parameter. Unlike the conventional methods, the method 300 allows the scheduler unit 102 to determine whether the entity is the background entity, the IO intensive entity, the non-background entity, or the non-IO intensive entity based on the at least one parameter.

At step 306, the method 300 includes instructing one of to schedule the entity on the little-core processor 104b when the entity is the background entity or the IO intensive entity; and to schedule the entity on the big-core processor 104a when the entity is the non-background entity or the non-IO intensive entity. Unlike the conventional methods, the method 300 allows the scheduler unit 102 to instruct the multi-core processor system 104 to schedule the entity on the little-core processor 104b when the entity is the background entity or the IO intensive entity; and to schedule the entity on the big-core processor 104a when the entity is the non-background entity or the non-IO intensive entity. In an embodiment, the parameter includes the OOM Score, the IO Turn-Around-Time, the amount of time that the entity is performing IO task in the pre-defined time period, the total execution time of the entity in the pre-defined time period, or combination of same. In an embodiment, the background entity is the periodic task or the period service without user intervention. Unlike the conventional systems and methods, the proposed method reduces the migration cost and improves the performance of the electronic device 100.

The various actions, acts, blocks, steps, or the like in the method 300 may be performed in the order presented, in a different order or simultaneously. Further, in some embodiments, some of the actions, acts, blocks, steps, or the like may be omitted, added, modified, skipped, or the like without departing from the scope of the invention.

Figure 4:
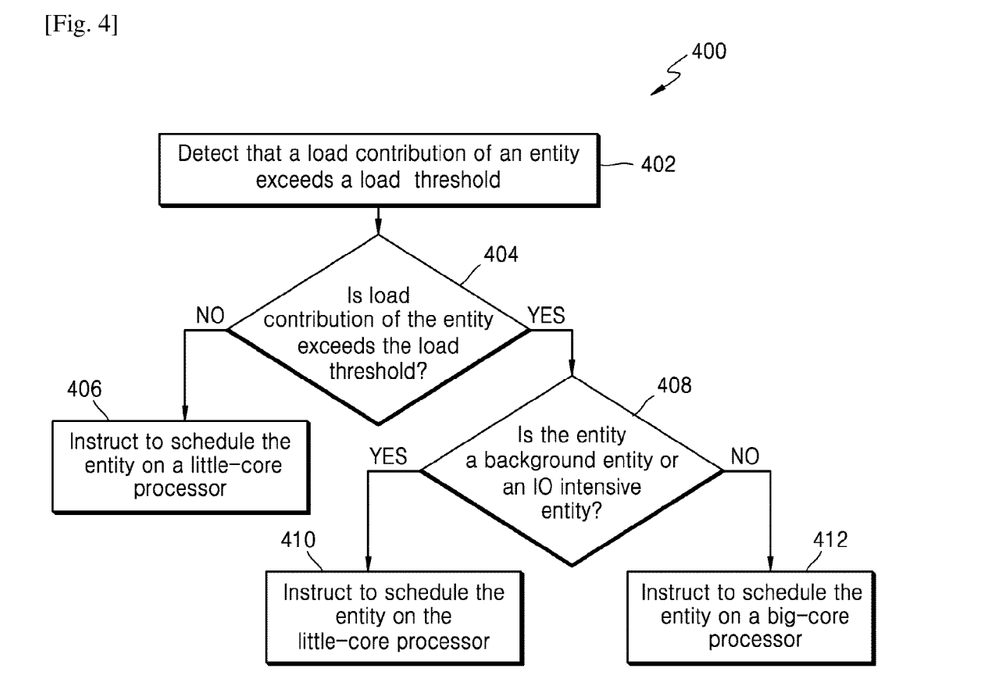
FIG. 4 is a flow diagram illustrating a method for determining whether the entity is one of the background entity, the IO intensive entity, the non-background entity, and the non-IO intensive entity, according to an embodiment as disclosed herein.

FIG. 4 is a flow diagram illustrating a method 400 for determining whether the entity is the background entity, the IO intensive entity, the non-background entity, or the non-IO intensive entity, according to an embodiment as disclosed herein. At step 402, the method 400 includes detecting that the load contribution of the entity exceeds the load threshold. The method 400 allows the scheduler unit 102 to detect that the load contribution of the entity exceeds the load threshold.

If it is determined, at step 404, that the load contribution of the entity exceeds the load threshold then, at step 406, the method 400 includes instructing to schedule the entity on the little-core processor 104b. The method 400 allows the scheduler unit 102 to instruct the multi-core processor 104 to schedule the entity on the little-core processor 104b.

If it is determined, at step 404, that the load contribution of the entity does not exceed the load threshold then, at step 408, it is determined that the entity is the background entity or the IO intensive entity based on the at least one parameter then, at step 410, the method 400 includes instructing to schedule the entity on the little-core processor 104b. The method 400 allows the scheduler unit 102 to instruct the multi-core processor 104 to schedule the entity on the little-core processor 104b. In an embodiment, the parameter includes the OOM Score, the IO Turn-Around-Time, the amount of time that the entity is performing IO task in the pre-defined time period, the total execution time of the entity in the pre-defined time period, or combination of same. In an embodiment, the background entity is the periodic task or the period service without user intervention.

If it is determined, at step 408, that the entity is neither the background entity nor the IO intensive entity then, at step 412, the method 400 includes instructing to schedule the entity on the big-core processor 104a. Unlike the conventional methods, the method 400 allows the scheduler unit 102 to instruct to schedule the entity on the big-core processor 104a.

The various actions, acts, blocks, steps, or the like in the method 400 may be performed in the order presented, in a different order or simultaneously. Further, in some embodiments, some of the actions, acts, blocks, steps, or the like may be omitted, added, modified, skipped, or the like without departing from the scope of the invention.

Figure 5:
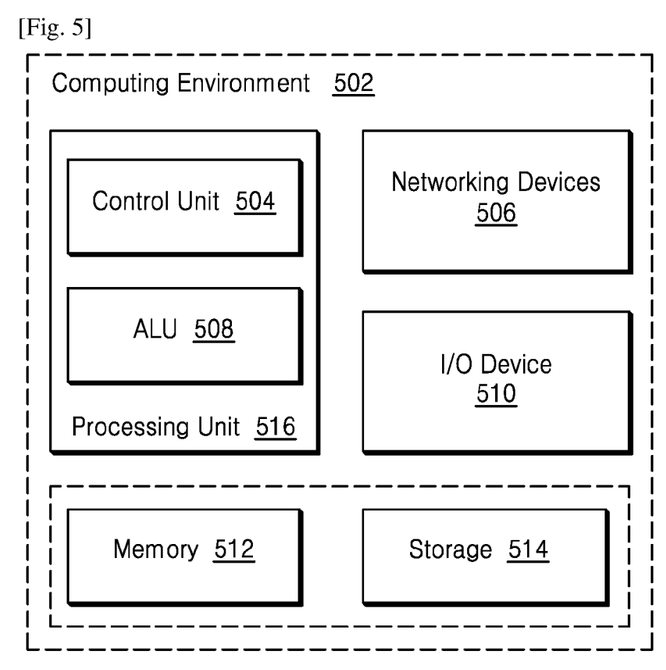

FIG. 5 illustrates a computing environment implementing the method and system for scheduling the entity in the multi-core processor system 104 including the big-core processor 104a, and the little-core processor 104b, according to embodiments as disclosed herein. As depicted in the figure, the computing environment 502 comprises at least one processing unit 516 that is equipped with a control unit 504 and an Arithmetic Logic Unit (ALU) 508, a memory 512, a storage unit 514, plurality of networking devices 506 and a plurality Input output (I/O) devices 510. The processing unit 516 is responsible for processing the instructions of the schemes. The processing unit 516 receives commands from the control unit 504 in order to perform its processing. Further, any logical and arithmetic operations involved in the execution of the instructions are computed with the help of the ALU 508.

The overall computing environment 502 can be composed of multiple homogeneous or heterogeneous cores, multiple CPUs of different kinds, special media and other accelerators. The processing unit 516 is responsible for processing the instructions of the schemes. Further, the plurality of processing units 516 may be located on a single chip or over multiple chips.

The scheme comprising of instructions and codes required for the implementation are stored in either the memory unit 512 or the storage 514 or both. At the time of execution, the instructions may be fetched from the corresponding memory 512 or storage 514, and executed by the processing unit 516.

In case of any hardware implementations various networking devices 506 or external I/O devices 510 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 5 include blocks which can be at least one of a hardware device, or a combination of hardware device and software units.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for scheduling an entity in a multi-core processor system including a big-core processor; and a little-core processor, the method comprising: detecting, by a scheduler, whether a load contribution of the entity exceeds a load threshold; when the load contribution of the entity does not exceed the load threshold: determining whether the entity is an idle entity or not, considering the entity as low priority for scheduling in response to a determination that the entity is the idle entity, and selecting the little-core processor for scheduling the entity in response to a determination that the entity is not the idle entity; after detecting that the load contribution of the entity exceeds the load threshold, determining, by the scheduler, whether the entity is one of a background entity, an input/output (IO) intensive entity, a non-background entity, and a non-IO intensive entity based on at least one parameter; and instructing, by the scheduler, scheduling the entity on the little-core processor when the entity is at least one of the background entity or the IO intensive entity, and scheduling the entity on the big-core processor when the entity is at least one of the non-background entity or the non-IO intensive entity.

2. The method of claim 1, wherein the at least one parameter comprises at least one of an Out-of-Memory (OOM) Score, an IO Turn-Around-Time, an amount of time that the entity is performing an IO task in a pre-defined time period, or a total execution time of the entity in the pre-defined time period.

3. The method of claim 1, wherein the background entity comprises one of a periodic task or a period service without user intervention.

4. The method of claim 2, wherein the OOM score is used to categorize the entity as either the background entity or the non-background entity.

5. The method of claim 1, wherein the at least one parameter comprises a deciding metric used to distinguish the IO intensive entity from the non-IO intensive entity.

6. An electronic device for scheduling an entity, the electronic device comprising: a memory; a multi-core processor system comprising a big-core processor, and a little-core processor coupled to said memory; and a scheduler coupled to the multi-core processor system, wherein the scheduler is configured to: detect whether a load contribution of the entity exceeds a load threshold; when the load contribution of the entity does not exceed the load threshold: determine whether the entity is an idle entity or not, consider the entity as low priority for scheduling in response to a determination that the entity is the idle entity, and select the little-core processor for scheduling the entity in response to a determination that the entity is not the idle entity; after detecting that the load contribution of the entity exceeds the load threshold, determine whether the entity is one of a foreground entity, a background entity, a Central Processing Unit (CPU) intensive entity, and an input/output (IO) intensive entity based on at least one parameter; and instruct scheduling the entity on the little-core processor when the entity is at least one of the background entity or the IO intensive entity, and scheduling the entity on the big-core processor when the entity is at least one of the non-background entity or the non-IO intensive entity.

7. The electronic device of claim 4, wherein the at least one parameter comprises at least one of an Out-of-Memory (OOM) Score, an IO Turn-Around-Time, an amount of time that the entity is performing IO in a pre-defined time interval, or a total execution time of the entity in the pre-defined time slice.

8. The electronic device of claim 6, wherein the background entity is one of a periodic task and a period service without user intervention.

9. The electronic device of claim 6, wherein the entity comprises at least one of a task, a thread or a data flow.

10. The electronic device of claim 6, wherein the scheduler is further configured to determine whether the entity is an idle entity when the load contribution of the entity does not exceed the load threshold.

11. The electronic device of claim 10, wherein the scheduler is further configured to:
consider the entity as low priority for scheduling in response to a determination that the entity is the idle entity; and
select the little core processor for scheduling the entity in response to a determination that the entity is not the idle entity.

12. The electronic device of claim 7, wherein the OOM score is used to categorize the entity as either the background entity or the non-background entity.

13. A computer program product comprising computer executable program code recorded on a computer readable non-transitory storage medium, the computer executable program code, when executed, causing actions including: detecting, by a scheduler, whether a load contribution of an entity exceeds a load threshold; when the load contribution of the entity does not exceed the load threshold: determining whether the entity is an idle entity or not, considering the entity as low priority for scheduling in response to a determination that the entity is the idle entity, and selecting a little-core processor for scheduling the entity in response to a determination that the entity is not the idle entity; after detecting that the load contribution of the entity exceeds the load threshold, determining, by the scheduler, whether the entity is one of a foreground entity, a background entity, a Central Processing Unit (CPU) intensive entity, and an input-output (IO) intensive entity based on at least one parameter; and instructing, by the scheduler, scheduling the entity on the little-core processor when the entity is at least one of the background entity or the IO intensive entity, and scheduling the entity on a big-core processor when the entity is at least one of the non-background entity or the non-IO intensive entity.

14. The method of claim 1, wherein the entity comprises at least one of a task, a thread or a data flow.

* * * * *